United States Patent [19]

Sakakibara

[11] Patent Number: 4,485,782

[45] Date of Patent: Dec. 4, 1984

[54] CONSTANT SPEED CONTROL DEVICES FOR VEHICLES

[75] Inventor: Naoji Sakakibara, Chiryu, Japan

[73] Assignee: Aisin Seiki Kabushiki Kaisha, Kariya, Japan

[21] Appl. No.: 483,605

[22] Filed: Apr. 11, 1983

[30] Foreign Application Priority Data

Apr. 12, 1982 [JP] Japan .................. 57/61480
Apr. 12, 1982 [JP] Japan .................. 57/61481

[51] Int. Cl.³ ............................................. F02D 7/00
[52] U.S. Cl. .................................. 123/389; 123/391; 60/611
[58] Field of Search ............ 123/391, 389, 378, 564; 417/187; 60/600, 601, 611

[56] References Cited

U.S. PATENT DOCUMENTS

| 3,315,730 | 4/1967 | Weaver et al. | 165/23 |
| 4,089,622 | 5/1978 | Aubel et al. | 417/188 |
| 4,227,372 | 10/1980 | Kakimoto et al. | 60/602 |
| 4,337,743 | 7/1982 | Mattson | 123/389 |
| 4,380,418 | 4/1983 | Crawford et al. | 123/389 |
| 4,391,246 | 7/1983 | Kawabata et al. | 123/391 |

FOREIGN PATENT DOCUMENTS

| 165738 | 12/1981 | Japan | 60/611 |
| 291152 | 6/1928 | United Kingdom | 123/378 |
| 306587 | 2/1929 | United Kingdom | 123/378 |

Primary Examiner—Magdalen Y. C. Moy
Attorney, Agent, or Firm—Finnegan, Henderson, Farabow, Garrett & Dunner

[57] ABSTRACT

A constant speed driving device has an ejector for supplying negative pressure to an actuator which controls the engine's throttle valve. The ejector includes a diffuser communicating with the engine intake manifold downstream of the throttle valve and a nozzle communicating through a pressure responsive control valve with the intake conduit upstream of the throttle valve and downstream of the supercharger. A negative pressure suction port of the ejector communicates with the negative pressure inlet port of the actuator. The constant speed control device is capable of supplying, even in the operation of the supercharger, a sufficiently increased negative pressure to the actuator for operating the throttle valve without the need to provide a vacuum pump.

Further, the speed control device includes an electromagnetic valve connected to the engine computer, which valve being is responsive to an input signal from the computer to pressure lock the pressure responsive control valve in its closed position so that the pressure from the supercharger cannot cause an air stream to flow through the nozzle. As a result, no negative pressure is applied to the actuator by the ejector.

5 Claims, 2 Drawing Figures

CONSTANT SPEED CONTROL DEVICES FOR VEHICLES

BACKGROUND OF THE INVENTION

This invention relates to a constant speed control device for a vehicle and, particularly, to a constant speed control device provided in an engine having a supercharger.

There is known an engine of a kind in which an amount of fuel in proportion to an amount of air supplied to the engine is injected from an injector into a combustion chamber of the engine, the latter being provided with a supercharger and a constant speed driving device. In constant speed driving devices of this kind, the opening of a throttle valve is controlled by an actuator operated by negative pressure from an intake manifold of the engine and controlled by a control signal from a computer or central processing unit, so that a constant driving speed is established.

In such an engine, when the supercharger operates, the negative pressure in the engine intake manifold tends to be reduced. This tendency becomes enhanced as the engine load increases, when the vehicle is driving on an upward slope, for example. The actuator operated by such reduced negative pressure insufficiently operates and controls the opening of the throttle valve so as to make desired constant speed driving impossible. To solve this problem, a system has previously been adopted in which an electrically operable vacuum pump is additionally provided and operated to increase the negative operating pressure. However, the provision of the vacuum pump renders the entire construction complicated and expensive.

SUMMARY OF THE INVENTION

It is, therefore, an object of the present invention to provide a constant speed control device capable of supplying, even in the operation of the supercharger, a sufficiently increased negative pressure to the actuator for operating the throttle valve without the need for providing an auxiliary vacuum pump.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims. To achieve these objects, and as embodied and broadly described herein, the constant speed control device of the present invention comprises an ejector for supplying negative pressure to said actuator, the ejector including a diffuser communicating with an intake manifold downstream of the throttle valve and a nozzle communicating through a pressure responsive control valve with an intake conduit upstream of the throttle valve and downstream of the supercharger, and a negative pressure suction port of the ejector communicating with a negative pressure inlet port of the actuator.

In such a constant speed driving device, however, there is a further problem that even when this device is not in operation, the control valve responsive to the output pressure of the supercharger opens to operate the negative pressure generating device.

Therefore, another object of the present invention is to solve this problem, and to this end, as embodied and broadly described herein, a constant speed driving device is provided having an electromagnetic valve connected to said computer, the valve being responsive to an input signal from the computer to pressure lock a servo-mechanism in the negative pressure generating device, so that the pressure responsive control valve responsive to the output pressure of the supercharger is locked in its closed position and the negative pressure generating device is held in its non-operating condition with no air stream supplied to its nozzle and thus no negative pressure supplied to the actuator by the ejector.

DESCRIPTION OF THE PREFERRED EMBODIMENT

Figure 1:
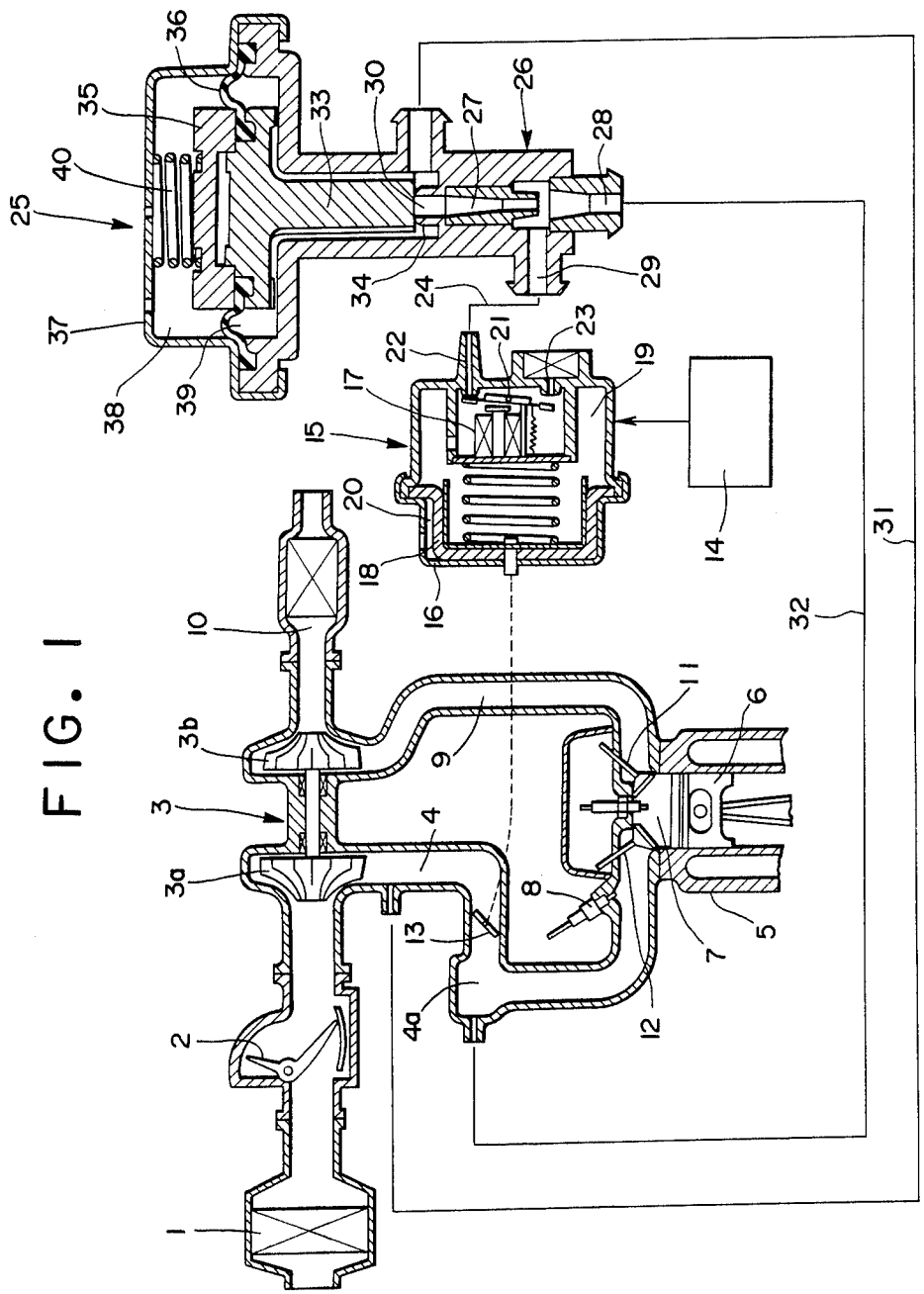
FIG. 1 is a part-fragmentary schematic longitudinal cross-section of an embodiment of a constant speed driving device constructed in accordance with the present invention.

An embodiment of a constant speed control device for a vehicle in accordance with the present invention is schematically and in part diagrammatically shown in FIG. 1 wherein numeral 1 is an air filter, numeral 2 is a flow meter, and numeral 3 is a supercharger having a compressor 3a and an exhaust gas turbine 3b directly connected to the compressor. Numeral 4 is an intake conduit, numeral 4a is an intake manifold, numeral 5 is an engine block, numeral 6 is a piston, numeral 7 is a combustion chamber, numeral 8 is a fuel injection nozzle, numeral 9 is an exhaust manifold, numeral 10 is an exhaust conduit, numerals 11 and 12 are valves, and numeral 13 is a throttle valve.

Numeral 14 is a computer or central processing unit including a vehicle speed detector and a comparator for detecting the differential speed between a preset vehicle speed and the actual vehicle speed, then converting it to a control signal and supplying the latter to an actuator 15. Actuator 15 includes a housing 16 containing an electromagnetic valve 17 and a resiliently biased diaphragm piston 18, the interior of the housing 16 being divided by the piston 18 into a variable pressure chamber 19 and a constant pressure chamber 20 which is in communication with atmosphere. The piston 18 is operationally connected to the throttle valve 13 as shown by a dotted line in FIG. 1. The electromagnetic valve 17 has a valve member 21 for opening and closing a negative pressure input port 22 which communicates with the variable pressure chamber 19 or an atmosphere port 23 which communicates with atmosphere.

The negative pressure input port 22 is in communication through a conduit 24 with a negative pressure generator 25. The negative pressure generator 25 is provided with an ejector 26 in its lower portion as shown in FIG. 1, the ejector 26 including a nozzle 27, a diffuser 28 and a suction port 29. The nozzle 27 is communicated through a pressure responsive valve 30 and a conduit 31 with the intake conduit 4 positioned upstream of the throttle valve 13 and downstream of the supercharger 3. The diffuser 28 is in communication through a conduit 32 with the intake manifold 4a downstream of the throttle valve 13. The suction port 29 is also connected through the conduit 24 to the negative pressure input port 22 of the actuator 15.

The pressure responsive valve 30 has a valve member 33 and a valve seat 34, the valve member 33 being integrally formed with a piston 35 at its upper portion. The valve member 33 and the piston 35 are axially movably supported by an annular diaphragm 36 which is fixed at its outer periphery to a casing 37, so that the interior of the casing 37 is divided by the piston 35 and the diaphragm 36 into a constant pressure chamber 38 and a variable pressure chamber 39. Provided within the constant pressure chamber 38 is a coiled compression spring 40 for acting to preload the piston 35 operating the presure responsive valve 30 so that this valve opens, only when the output pressure of the supercharger to the nozzle 26 is higher than a predetermined value.

The operation of the device described above is as follows: When the engine starts to operate the supercharger 3, air is sucked through the air filter 1 and then supplied through the flow meter 2, the compressor 3a of the supercharger 3, the intake conduit 4 and the intake manifold 4a to the combustion chamber 7. When a desired vehicle speed of, for example, sixty kilometers per hour is preset into the computer 14, a signal corresponding to such speed is fed to the actuator 15. The electromagnetic valve 17 of the actuator which receives this signal input is operated to provide a ratio of opening and closing times of the negative pressure input port 22 and atmosphere port 23 that corresponds to that signal input. Since the negative pressure port 22 is supplied with the negative pressure derived from the intake manifold downstream of the throttle valve 13, by way of the conduit 32, diffuser 28, the suction port 29 and the conduit 24, the variable pressure chamber 19 is subjected by the above mentioned operation of the electromagnetic valve 17 to the negative pressure corresponding to the signal input. Thus, the piston 18 is displaced in response to that negative pressure, i.e., that signal input, to control the opening of the throttle valve 13 to establish the preset vehicle speed so that the vehicle can be driven substantially at the constant speed. In the event that there is caused a difference between the actual vehicle speed and the preset vehicle speed, a speed correcting signal is fed from the computer 14 to the actuator 15 to energize the electromagnetic valve 17 thereby operating the valve member 21 so that the negative pressure within the variable pressure chamber 19 and thus the position of the piston 18 is adjusted to operate the throttle valve 13 controlling the supply of air to the engine to regain the constant driving speed of the vehicle.

When the engine load is abruptly increased, as in the event of the vehicle being driving on an upward slope, the throttle valve 13 must be operated by the actuator 15 to further open its opening for increasing the engine output as is necessary. Consequently, the pressure of the exhaust gas is increased and thus the output of the supercharger 3 is increased. This results in the fact that the negative pressure within the intake manifold 4a becomes reduced to a value almost equal to the atmospheric pressure. Thus, the actuator 15, which receives the negative pressure as the operating pressure from that portion through the conduit 32, will be subjected to an insufficient negative pressure for operation so that the control of the valve 13 and the constant driving speed can not be achieved.

However, the pressure present responsive valve 30 receives the pressure in the intake conduit 4 upstream of the throttle valve 13 by way of the conduit 31 and opens in response to that pressure to permit the flow of air under a positive pressure from the intake conduit into the nozzle 27 of the ejector 26. The flow of air through the ejector 26 is then conveyed to the diffuser 28, through the conduit 32 and into the intake manifold 4a downstream of the throttle valve 13. In so doing, a negative pressure is generated in the ejector 26 and supplied from the suction port 29 through the conduit 24 to the negative pressure input port 22 of the actuator 15. The opening of the throttle valve 13 is satisfactorily controlled thereby since there is no lack of the negative pressure needed for operating the throttle valve 13.

As described above, when the output pressure of the supercharger rises up to a predetermined value, the pressure responsive valve 30 opens to operate the ejector 26 and the negative pressure produced is introduced into the actuator 15 to cause the latter to control the opening of the throttle valve 13. Thus, the device of FIG. 1 can attain the above-mentioned objects of the present invention and bring forth the effect of providing a simple and easy construction in which only by the provision of the pressure responsive valve 30 a required negative pressure can be introduced to the actuator irrespective of the supercharger being in operating or non-operating condition.

Figure 2:
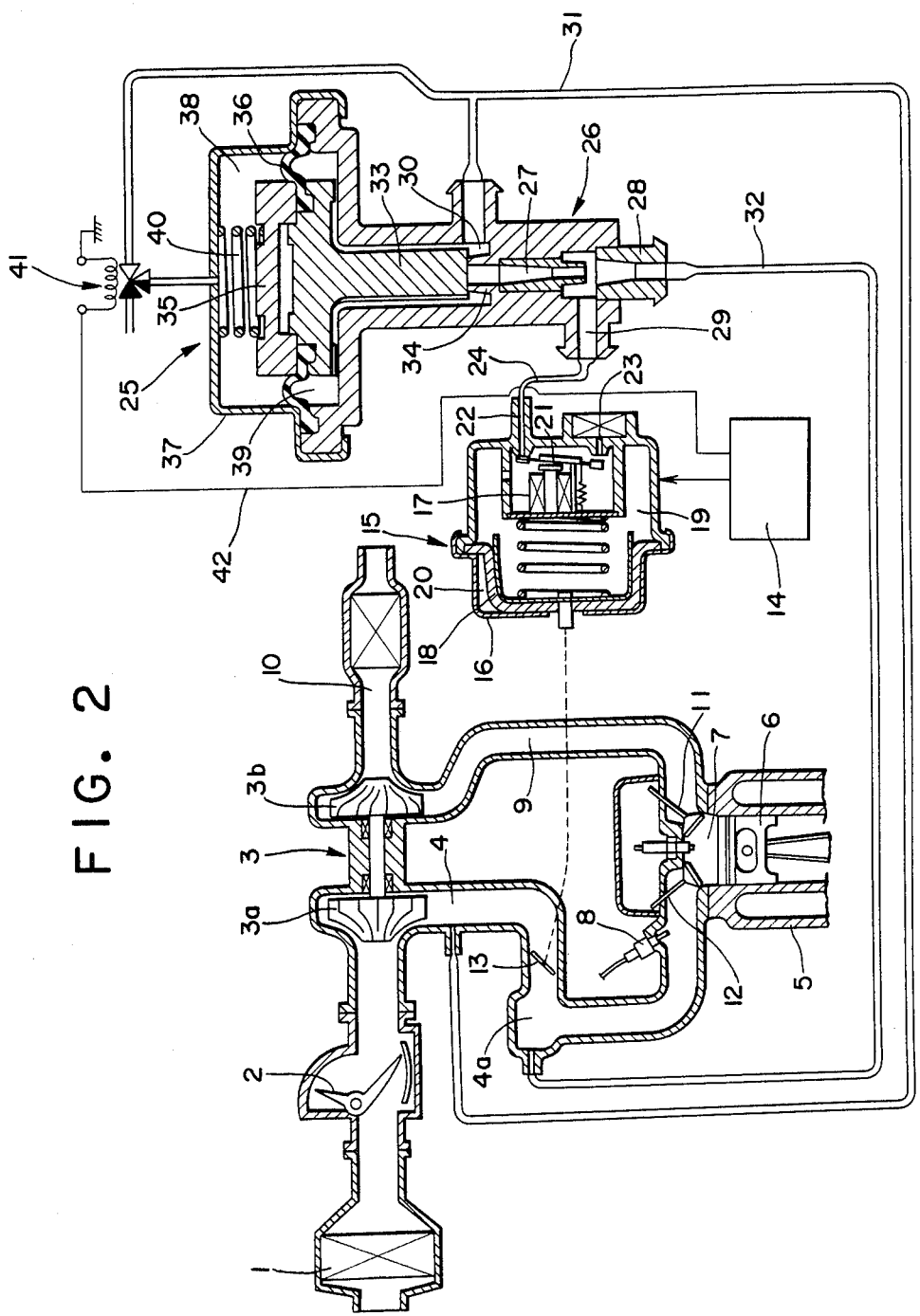
FIG. 2 is a cross-sectional view similar to FIG. 1 and shows another embodiment of the construction of the device of the present invention.

FIG. 2 shows another embodiment of the constant driving speed device in accordance with the present invention and the same reference numerals shown in FIG. 2 designate such parts thereof as are the same or similar to those of the device of FIG. 1. Therefore, no further description on the construction and operation of such parts of the device of FIG. 2 will be required.

However, the device of FIG. 2 is further provided with an electromagnetic valve 41 through which the constant pressure chamber 38 of the negative pressure generator 25 can communicate with the conduit 31 and thus with the intake conduit 4. As described hereinabove, the coiled compression spring 40 provided within the constant pressure chamber 38 acts to preload the piston 35 operating the pressure responsive valve 30 to open only when the output pressure of the supercharger applied to the nozzle 26 is higher than a predetermined value. If there is provided no electromagnetic valve 41, therefore, the piston 35 will cause the pressure responsive valve 30 to open, even when the operation of constant speed driving is being established. Consequently, the negative pressure generator 25 will be operated even when the constant speed driving device is being used. In this event, a by-pass line is not formed to the throttle valve 13 through the conduit 31, the ejector 26 and the conduit 32 to lose control of the throttle valve.

In the device of FIG. 2, however, the electromagnetic valve 41 receives an input signal of the non-operation of constant speed driving from the computer 14 through a line 42, so that the valve 41 opens to supply the output pressure of the supercharger into the constant pressure chamber 38. Consequently, the piston 35 is subjected to the same pressure on both its sides and held in the same position so that the pressure responsive valve 30 is held in its closed position. Therefore, the ejector 26 is not actuated, and the negative pressure generator remains in its non-operative condition. No negative pressure is supplied to the negative pressure input port 22 of the actuator 15 when the constant speed driving device is not being used.

As described above, the device of FIG. 2 is also operated so that when the output pressure of the supercharger attains the predetermined value the pressure responsive valve 30 opens to operate the ejector 26 and the negative pressure produced is introduced into the actuator 15 to cause the latter to control the opening of the throttle valve 13, and thus there are brought forth the effects that since the negative pressure generator is not operated in non-operation of constant speed driving, no air supply line is formed for by-passing the throttle valve, and the time can be reduced for establishing the engine idling condition.

What is claimed is:

1. A constant speed driving device for a vehicle having an intake conduit connected to an engine intake manifold, a supercharger provided in said intake conduit, an injector for injecting into a combustion chamber of the engine an amount of fuel in proportion to the amount of air supplied to the combustion chamber, and a throttle valve provided between said supercharger and said intake manifold; said constant speed driving device comprising an actuator responsive to a negative pressure to control said throttle valve;
a negative pressure generator for supplying a negative pressure to said actuator, said negative pressure generator comprising
  an ejector including a nozzle in communication with said intake conduit between said supercharger and throttle,
  a diffuser in communication with said intake manifold,
  a suction port associated with said diffuser and in communication with said actuator to supply the negative pressure thereto,
  a pressure responsive valve disposed between said intake conduit and said nozzle, and
  a servo-mechanism for operating said pressure responsive valve, said servo-mechanism having
    a double-acting piston adapted to receive the output pressure of said supercharger on both ends thereof and
    a valve for controlling the supply of output pressure of said supercharger to one end of said piston,
  said pressure responsive valve being normally closed and being opened when the output pressure of said supercharger exceeds atmospheric pressure and is applied to only the other end of said double-acting piston; and
a computer for supplying a first control signal for controlling the negative pressure level in said actuator and a second control signal to operate said servo-mechanism valve, so that the operation of said throttle valve is controlled to maintain the vehicle speed at a predetermined value.

2. A device according to claim 1, wherein said servo-mechanism valve is an electromagnetic valve.

3. A constant speed driving device for a vehicle having an intake conduit connected to an engine intake manifold, a supercharger provided in said intake conduit, an injector for injecting into a combustion chamber of the engine an amount of fuel in proportion to the amount of air supplied to the combustion chamber, and a throttle valve provided between said supercharger and said intake manifold; said constant speed driving device comprising an actuator responsive to a negative pressure to control said throttle valve, said actuator comprising
  a piston operationally connected to said throttle valve, said piston dividing the interior of said actuator into a constant pressure chamber in communication with atmosphere and a variable pressure chamber, said variable pressure chamber having
    a negative pressure input port and
    a vent port, and
  a valve for opening and closing said negative pressure input port and said vent port thereby controlling the negative pressure level within said variable pressure chamber;
a negative pressure generator for supplying a negative pressure to said actuator said negative pressure generator comprising
  an ejector including a nozzle in communication with said intake conduit between said supercharger and throttle,
  a diffuser in communication with said intake manifold,
  a suction port associated with said diffuser and in communication with said negative pressure input port of said variable pressure chamber to supply the negative pressure thereto, and
  a pressure responsive valve disposed between said intake conduit and said nozzle, said pressure responsive valve being normally closed and being opened when the output pressure of said supercharger exceeds atmospheric pressure; and
a computer for supplying a control signal for controlling the negative pressure level in said actuator so that the operation of said throttle valve is controlled to maintain the vehicle speed at a predetermined value.

4. A device according to claim 3, wherein said negative pressure generator further includes a servo-mechanism for operating said pressure responsive valve, said servo-mechanism having a double-acting piston adapted to receive the output pressure of said supercharger on both ends thereof and a valve operated in response to a second control signal from said computer for controlling the supply of output pressure of said supercharger to one end of said piston.

5. A device according to claim 4, wherein said servo-mechanism valve is an electromagnetic valve.

* * * * *